United States Patent [19]
Columbus et al.

[11] Patent Number: 6,066,689
[45] Date of Patent: May 23, 2000

[54] ADHESIVE APPLICATOR CRAYON

[75] Inventors: Peter Spiros Columbus, Melville, N.Y.; John Anderson, Hilliard, Ohio

[73] Assignee: Elmer's Products, Inc., Columbus, Ohio

[21] Appl. No.: 08/973,215

[22] PCT Filed: Apr. 23, 1997

[86] PCT No.: PCT/US97/06713

§ 371 Date: Dec. 4, 1997

§ 102(e) Date: Dec. 4, 1997

[87] PCT Pub. No.: WO98/47953

PCT Pub. Date: Oct. 29, 1998

[51] Int. Cl.[7] .................................................. C08K 5/098
[52] U.S. Cl. ......................................... 524/322; 524/400
[58] Field of Search ..................................... 524/322, 400

[56] References Cited

U.S. PATENT DOCUMENTS

| | | |
|---|---|---|
| 3,576,776 | 4/1971 | Muszik et al. . |
| 3,787,345 | 1/1974 | Dickman et al. . |
| 3,876,573 | 4/1975 | Engelhardt ............................ 260/17.4 |
| 4,073,756 | 2/1978 | Yotsuyanagi et al. . |
| 4,075,830 | 2/1978 | Nagasawa et al. . |
| 4,176,107 | 11/1979 | Buckman ............................... 260/29.6 |
| 4,325,851 | 4/1982 | Colon et al. . |
| 4,413,087 | 11/1983 | Bernot ..................................... 524/389 |

*Primary Examiner*—Paul R. Michl
*Attorney, Agent, or Firm*—Standley & Gilcrest LLP

[57] ABSTRACT

Adhesive compositions exhibiting fast cure time in solid form, e.g. in the form of an applicator crayon or glue stick. The adhesive exhibiting polymer of the composition is based on a mixture of critical amounts of high molecular weight polyvinylpyrrolidone polymer, with a lower molecular weight polyvinylpyrrolidone polymer, with water, an organic solvent, and a salt of a long-claim fatty acid, e.g. sodium stearate. Color indicators and other optional ingredients, e.g. mildewcide, can be included.

21 Claims, No Drawings

ADHESIVE APPLICATOR CRAYON

BACKGROUND OF THE INVENTION

1. Field of the Invention

Fast setting adhesive formulations in an easy applicator form are desirable for office, school and home consumers. The present invention provides a polyvinylpyrrolidone (hereinafter "PVP")-based composition in solid form, e.g. glue stick or crayon, which is easy to apply, bonds faster and is safe to use. The adhesive bonds porous substrates to which they are applied, such as paper, fabrics, polystryene foam, wood and similar porous substrate materials.

2. Description of the Related Art

U.S. Pat. Nos. 3,576,776, issued in 1971, contains a disclosure of an invention for adhesive applicator crayons comprising a shape-giving base consisting of a gel-forming salt, a liquid, and an adhesive component. Among the adhesives are listed salts of various acids, amides, and N-alkyl substituted amides including polyvinylpyrrolidone. The disclosure of U.S. Pat. No. 3,576,776 was said to be an improvement over known adhesive applicator crayons prepared from rubber, resins and waxes, which required that surface layers must be rubbed off from such crayons under relatively high pressure in order to carry out the spreading of the adhesive.

Later solid adhesive compositions, such as those disclosed in U.S. Pat. Nos. 4,073,756 and 4,075,830, were said to avoid the problem inherent in the crayons of U.S. Pat. No. 3,576,776, the long time it took to produce the adhesive composition and the high viscosity of the adhesive composition (e.g. higher than 150,000 cps) which made it difficult to fill the adhesive composition in containers.

The later patents thus used water soluble or water dispersible polymers having adhesive properties in combination with N-fatty acid acylated amino acids or salts thereof and water, or a mixture of water and one or more organic solvent(s) and/or plasticizer(s). The water dispersible or water soluble polymers having adhesive properties listed, among others, homopolymers or copolymers having a carboxyl group or a carboxylic anhydride group, where the proportions of the carboxyl and/or carboxylic anhydride group containing monomer is preferably about 30 to 100 mol %.

These, and other prior art formulations (the entire disclosures of all of which are herein incorporated by reference), were still slow to exhibit adhesive properties when dispensed, i.e. slow to exhibit paper tear when applied to bond paper.

Among other properties, the present invention provides strong final bonds and a pH generally in the range of about 8.5 to about 9.5. However, in the embodiments of the invention where a color indicator is used, the hue or intensity of the color is enhanced by having a pH more alkaline than the range given above, e.g. up to a pH of about 11, e.g. 10.9–11.1.

OBJECT OF THE INVENTION

It is thus an object of the invention to provide new adhesive compositions exhibiting fast adhesive properties (e.g. fast initial tear of paper) and strong final bonds.

It is a further object of the invention to provide adhesive compositions in the form of solids at ambient conditions, i.e. glue sticks or applicator crayons which exhibit fast adhesive properties when applied to a substrate and suitable for bonding paper, fabric, polystyrene foam and similar materials.

It is a still further object of the invention to provide bonded substrates, such as paper, fabric, and similar porous materials, bonded with the adhesive compositions of the invention.

SUMMARY OF THE INVENTION

Water-based solid adhesive crayons which contain water in a mixture comprising a relatively low molecular weight (all references to "molecular weight" in this Specification, claims and Abstract are intended to mean "weight average molecular weight" unless otherwise designated) water dispersible or water soluble polymer, e.g. polyvinylpyrrolidone polymer, i.e. a molecular weight below about 1,300,000, and a critical amount of a relatively high molecular weight water dispersible or water soluble polymer, e.g. polyvinylpyrrollidone polymer, i.e. a molecular weight above 1,300,000. By critical amounts is meant sufficient amounts of the high molecular weight (polyvinylpyrollidone) polymer to impart 1.) a fast film-forming or setting property, 2.) a strong final bonding property, and 3.) an additional firmness to the crayon adhesive to reduce "crumbling" when pressure is applied to the crayon, while keeping the water content of the adhesive at 50 weight percent, or more, to ensure easy spreading and performance during use and after storage. Optional ingredients include a plasticizer for the (polyvinylpyrollidone) polymers to impart a degree of flexibility to the dry adhesive film, a preservative to protect the adhesive from attack by microorganisms, a long chain fatty acid salt to impart a solid gel property to the adhesive, and a color indicator for the purpose of indicating when an applied film of adhesive has dried.

This composition may be formulated so as to exhibit physical properties of a solid, e.g. it may be formulated so as to be suitable for application in the form of a crayon or glue stick to porous substrates to be bonded. The composition is preferably formulated so as to be satisfactorily extruded from and retracted into a container, exhibit good spreadability without being "runny" or dispensing excessive adhesive to a substrate nor so firm that the crayon or adhesive stick "crumbles" due to the requirement to exert excessive pressure during application of the crayon/stick to a substrate to effect adequate spreading of the adhesive on the substrate.

It is also within the purview of the invention to provide substrates bonded with the formulations of the invention.

DETAILED DESCRIPTION OF THE INVENTION

The composition of matter of this invention exhibits adhesive properties and is formulated of components (A), (B), (C), and (D), wherein (A) is an aqueous vehicle, typically water or aqueous emulsions/dispersions of one or more of components (B), (C), (D) and/or any optional components; (B) is at least one water soluble or water dispersible polymer, e.g. polyvinylpyrolidone (hereinafter "PVP") polymer exhibiting adhesive properties having a molecular weight below about 1,300,000, (C) is a salt of a long chain fatty acid or a precursor thereof which forms a salt of a long chain fatty acid when combined with the other components of the compositions of matter of this invention and (D) is a water soluble or water dispersible polymer, e.g. a PVP polymer having a molecular weight above about 1,300,000, preferably above about 2,000,000 most preferably of at least about 2,800,000. Suitable polymers for component (B) include homopolymers or copolymers of the types identified in U.S. Pat. Nos. 4,073,756 or 4,954,544, although PVP is particularly preferred. Although higher molecular weight polymers of component (D) can be of the same type of polymer as component (B), it is preferred that the high molecular weight polymer be PVP.

When it is desirable, certain optional ingredients may be included in the composition of matter of the invention, e.g. a mildewcide and/or fungicide, solvents for the adhesive exhibiting polymeric components, e.g. alcohols, such as glycerol or polyglycols for PVP, pigments and/or dyes to impart a permanent color, and/or a color indicator, such as phenolphthalein or thymolphthalein, for indicating when the applied film is dried.

Generally, the components of the invention may be combined over a wide range. However, in order to formulate the composition of matter in solid form, e.g. suitable for use, as an adhesive applicator stick or crayon, it is preferable that the composition contain not less than about 50% nor more than about 80% (all % in this application are by weight unless otherwise noted) by weight of component (A) (wherein (A) is water). If (A) is an aqueous formulation containing one or more components (B)–(D), or having optional components, the amount of (A) can be adjusted so as to be greater than, or lesser than, the amounts indicated. Although it is preferable that the composition contain not less than about 50%, preferably not less than about 60% of component (A) (where (A) is water) this amount can be adjusted lower, e.g. 45% or less though not exhibiting the most preferred properties of the adhesive stick of the invention. The presence of plasticizers, solvents or mixtures thereof for the water dispersible polymers may also decrease the requirements for component (A) to be present in an amount of not less than 50%, because such plasticizers/solvents enhance the spreadability properties. As with the case of the maximum content of component (A), when (A) is an aqueous formulation containing one or more of components (B)–(D), or any optional components, the amount of (A) will be adjusted accordingly.

Component (B) is at least one polymer exhibiting adhesive properties, preferably a polyvinylpyrrolidone (PVP) of relatively low molecular weight, e.g. below about 1,300,000. PVP polymers are commercially available in several viscosity grades, ranging from very low to very high molecular weight. This range, coupled with solubility in water, aqueous and organic solvent systems and its non-toxic character, give PVP great flexibility in the compositions and applicator solid forms of the present invention.

Commercially available PVP suitable for use in this invention as components (B) or (D) are available from GAF Chemicals Corporation, International Specialty Products, of Wayne, N.J., U.S.A., under the tradenames PVP K-90 and PVP K-120, each having an off-white powder appearance. PVP K-90 has a viscosity average molecular weight of 630,000 (performed at 25° C., in $H_2O$, using Mark Houwink constants of K=1.4×10$^{-4}$ and a =0.7), a weight average molecular weight (Wt.Avg.MW) of 1,280,000 (obtained by low angle laser light scattering (LALLS) photometry) and a K-value of 88–100. PVP K-120 has a viscosity average molecular weight of 1,450,000 (performed under the same conditions above); a weight average molecular weight of 2,800,000 (performed by LALLS photometry as above) and a K-value of 115–125. These same polymers are also available as solutions from the same source. Other commercially available PVP in powder or solution form can be obtained from BASF Corporation of Mount Olive, N.J., U.S.A. under the registered trademark LUVISKOL over a wide range of molecular weights. Luviskol K-90 has a weight average molecular weight of 1,200,000; Luviskol K-80 has a weight average molecular weight of 900,000 and Luviskol K-60, K-30 and K-77 have lower molecular weights. These products are described in the Luviskol® Polyvinylpyrollidone Polymers catalog by BASF corporation and PVP Polyvinylpyrollidone Polymers catalog by ISP (International Specialty Products) GAF corporation, the entire disclosures of which are herein incorporated by reference.

It is to be expressly understood that the identification of the aforementioned commercially available sources of PVP polymers and/or solutions is by way of illustration only and not by way of limitation; as other commonly available sources or synthesized polymers may be used in the invention without departing from the spirit or scope of the appended claims.

Preferably, in the compositions of the invention, component (B) is present in amounts of at least about 12% but not more than about 26%. More than one low molecular weight polymer can be used as component (B). When more than one low molecular weight adhesive-exhibiting polymer is present, it is preferable that the higher molecular weight polymer of such low molecular weight polymers is present in an equal or greater amount.

Component (C) is generally present from about 3% to about 10%, based on the total weight of the composition, preferably in the range of about 6% to about 8%. Component (C) is a long chain (i.e. $C_{15}$–$C_{16}$) fatty acid, preferably in the form of a salt with an alkali-metal or alkaline earth metal, e.g. Li, Na, K, Ca, Sr, Ba, most preferably sodium stearate. It enhances spreading properties when the crayon or glue stick is rubbed against a porous substrate.

Component (D) is a high molecular weight (e.g. above about a molecular weight of 1,300,000, preferably above 2,000,000, most preferably at least 2,800,000) polymer, e.g. PVP. The amount of component (D) is sufficient to impart fast setting properties, e.g. preferably in less than 20 seconds, preferably less than 15 seconds to the film applied to a porous substrate from the glue stick of the invention. However, the amount of component (D) should not be so great as to induce crumbling when pressure is applied to the glue stick upon rubbing the stick on the porous substrate. The amount of component (D) will vary with the molecular weight of the polymer, lower amounts being required with the highest molecular weights. In general, component (D) may be present in an amount of from about 0.5% to about 10%, preferably about 0.5% to about 4%. Most preferably, the amount of component (D) is at least 0.5 wt %, preferably at least 0.7 wt %, most preferably at least about 1 wt %.

When a solvent for the water dispersible polymer, e.g. PVP, is present, it is preferably an organic solvent. Preferably the solvent is an alcohol, more preferably an alcohol selected from the group consisting of glycerol, polyglycols, especially low molecular weight polyglycols, e.g. propylene glycol and mixtures thereof, though most preferably, glycerols and propylene glycol. Other solvents, including acids, ketone and ether alcohols, lactones, lactams, certain esters, ketones and chlorinated hydrocarbons; esters and nitroparaffins are known solvents for PVP. The solvent is present in amounts ranging from about 3% to about 8%, preferably about 3.2% to about 7%.

Plasticizers for the water soluble/dispersible polymers may also be included in the formulations of the inventions. Low molecular weight polyethylene glycols, e.g. having a M.W. of 400 or less, are particularly good plasticizers.

The compositions of the invention can be made by mixing components (A)–(D), and any optional components, in any order. During this mixing, temperature can be elevated to 85–95° C. and mixing continued with slow agitation until components (B) and (D) are completely dissolved (within about 15 minutes) and the component (C) and any optional ingredients added and mixed until dissolved completely. Alternatively, components (A) can be mixed with (C) and/or any optional components and then mixed with the polymer components (B) and (D). Still further components (A), (B) and (D) can be mixed, or components (B) and (D) can be in solution/dispersion form, before being mixed with any other component. The resulting composition can be extruded directly into glue stick containers or drawn off into drums for storage to be reheated and used at a future date.

When an optional component for controlling microorganisms is added, it may take the form of a mildewcide and/or fungicide. Suitable substances are commercially available, such as the mildewcide sold under the trademark "DOWICIL 150" (available from Dow Chemical Corporation, Midland, Mich., USA) in an effective amount, e.g. as little as 0.18 wt % to 0.20 wt %.

Permanent color can be imparted to the composition of the invention by including pigments and/or dyes as an optional component.

When a color indicator is added for the purpose of indicating when the film has dried, the freshly applied adhesive has a color, e.g. blue, which fades to colorless when the adhesive has dried, e.g. in about 9–15 seconds. When the color indicator is present in combination with a permanent color, the color will change from the as applied to dried adhesive, rather than fade to colorless.

As suitable indicators can be used phenolphtalein (chemical name 3,3-bis(4-hydroxyphenyl)-1-(3H)-isobenzofiuranone)orthymolphthalein(chemical name 3,3-bis[4-hydroxy-2-methyl-5-(1-methylethyl)phenyl]-1-(3H)-isobenzofuranone. These indicators are commerically available such as phenolphthalein and its alkyl derivatives. The indicators are present in an effective amount to indicate a change between a color and colorless phase and generally are present in an amount of not more than 2 wt % preferably from about 0.01 to about 0.5 wt %. As mentioned hereinabove, higher alkalinity enhances the intensity of these indicators to impart a stronger hue to the color exhibited.

The advantages of the compositions of the invention will be illustrated by the following Examples and Comparative Examples. In the Examples, it can be seen that the properties of the composition, especially properties of extension and retraction of the composition from a container and most importantly its spreading and setting characteristics, can be tailored by proportioning the components.

| Examples | Composition Formation Chem. | GMS. | Net Weight Stick | GEL | COLOR | Setting Time | Extension | Retraction | Spreading Properties |
|---|---|---|---|---|---|---|---|---|---|
| 1 | Water<br>PVP 90<br>PVP 120<br>Glycerol<br>Na Stearate<br>Dowicil | 60.10<br>24.70<br>01.00<br>07.00<br>07.00<br>00.20<br>———<br>100.00 | 22 g | Firm | Creamy white | 12 sec. | Some resistance to extension | Failed* | Slight difficulty in spreading Required additional pressure which appiied excessive adhesive |
| 2 | Water<br>PVP 90<br>PVP 120<br>Glycerol<br>Na Stearate<br>Dowicil 150 | 60.10<br>25.00<br>00.70<br>07.00<br>07.00<br>00.20<br>———<br>100.00 | 22 g | Firm | Creamy white | 11 sec. | Slight resistance to extension | Failed* | Some difficulty in spreading but better than Ex. no crumbling |
| 3 | Water<br>PVP 90<br>PVP 120<br>P.G.<br>Na Stearate<br>Dowicil 150 | 60.10<br>24.70<br>01.00<br>07.00<br>07.00<br>00.20<br>———<br>100.00 | 22 g | Less firm than Ex. 1 and 2 | Creamy white | 15 sec. | Easy | Easy | Easier spreading but excess glue applied due to softness |
| 4 | Water<br>PVP 90<br>PVP 120<br>P.G.<br>Glycerol<br>Na Stearate<br>Dowicil 150 | 60.10<br>24.70<br>01.00<br>03.50<br>03.50<br>07.00<br>00.20<br>———<br>100.00 | 22 g | Firm | Creamy white | 9 sec. | Easy | Easy | Easy spreading. no crumbling |
| 5 | Water<br>PVP 90<br>PVF 120 | 60.10<br>24.70<br>01.00 | 22 g | Slightly soft | Creamy white | 9–10 sec. | Easy | Easy | Easy spreading, no |

-continued

| Examples | Composition Formation Chem. | GMS. | Net Weight Stick | GEL | COLOR | Setting Time | Extension | Retraction | Spreading Properties |
|---|---|---|---|---|---|---|---|---|---|
| | P.G.[1] | 01.50 | | | | | | | crumbling |
| | Glycerol | 05.50 | | | | | | | |
| | Na Stearate | 07.00 | | | | | | | |
| | Dowicil 150 | 00.20 | | | | | | | |
| | | 100.00 | | | | | | | |
| 6 | Water | 60.10 | 15 g | Firm | Creamy white | 9 sec. | Easy | Easy | Easy spreading, no crumbling |
| | PVP 90 | 24.95 | | | | | | | |
| | PVP 120 | 00.75 | | | | | | | |
| | P.G.[1] | 03.50 | | | | | | | |
| | Glycerol | 03.50 | | | | | | | |
| | Na Stearate | 07.00 | | | | | | | |
| | Dowicil 150 | 00.20 | | | | | | | |
| | | 100.00 | | | | | | | |
| 7 | Water | 60.10 | 15 g | Slightly soft | Crearny white | 9 sec. | Easy | Easy | Ever so slight spreading resistance due to slightly softer stick: no crumbling |
| | PVP 90 | 25.20 | | | | | | | |
| | PVP 120 | 00.50 | | | | | | | |
| | P.G.[1] | 03.50 | | | | | | | |
| | Glycerol | 03.50 | | | | | | | |
| | Na Stearate | 07.00 | | | | | | | |
| | Dowicil 150 | 00.20 | | | | | | | |
| | | 100.00 | | | | | | | |
| 8 | Water | 60.10 | 22 g | Slightly less firm | Creamy white | 11 sec. | Easy | Failed* | Slight crumbiing |
| | PVP 90 | 25.00 | | | | | | | |
| | PVP 120 | 00.70 | | | | | | | |
| | Glycerol | 08.00 | | | | | | | |
| | Na Stearate | 06.00 | | | | | | | |
| | Dowicide | 00.20 | | | | | | | |
| | | 100.00 | | | | | | | |
| 9 | Water | 60.97 | 22 g | Firm | Blue when applied. colorless when dry | 9 sec. | Easy | Easy | Easy spreading, no crumbling |
| | Propylene Glycol | 3.33 | | | | | | | |
| | Glycerol | 3.33 | | | | | | | |
| | PVP 90 | 23.76 | | | | | | | |
| | PVP K-120 | 0.71 | | | | | | | |
| | Thymoi-phthalein | 0.24 | | | | | | | |
| | Na Stearate | 6.67 | | | | | | | |
| | Sodium Hydroxide Pellets | 0.20 | | | | | | | |
| | Water (Deionized) | 0.60 | | | | | | | |
| | Dowicil 150 | 0.19 | | | | | | | |
| | | 100.00 | | | | | | | |
| Comparative 1 | UHU Stic | | 21 g | Firm | White opaque | 28–30 sec. | Easy | Easy | Easy spreading. no crumbling |
| Comparative 2 | Ross Envelope | | 8.5 g | Firm | Creamy white | 25 sec. | Easy | Easy | Easy spreading. no crumbling |
| Comparative 3 | Ross Kidstik | | 8.5 g | Firm | Fuchsia/ purple | 23 sec. | Easy | Easy | Easy spreading. no crumbling |
| Comparative 4 | Avery | | 7.4 g | Slightly less firm | Creamy white-white | 25 sec | Easy | Failed* | Spreads with some resistance due to a slightly less firm stick |
| Comparative 5 | 3M Scotch | | 7.08 g | Firm | Creamy white | 20 scc. | Easy | Easy | Easy spreading, no crumbling |
| Comparative | Water | 60.10 | 22 g | Very | Creamy | >than 15 | Easy | Easy | Spreads |

-continued

| Examples | Composition Formation Chem. | GMS. | Net Weight Stick | GEL | COLOR | Setting Time | Extension | Retraction | Spreading Properties |
|---|---|---|---|---|---|---|---|---|---|
| tive 6 | PVP 30[1] P.G.[1] Glycerol Na Stearate Dowicil 150 | 25.70 03.50 03.50 07.00 00.20 100.00 | | soft | white | min. | | | with some resistance due to glue crumbling |
| Comparative 7 | Water PVP 30[2] PVP 90 P.G.[1] Glycerol Na Stearate Dowicil 150 | 60.10 12.85 12.85 03.50 03.50 07.00 00.20 100.00 | 22 g | Very sort | Creamy white | 90 sec. | Easy | Easy | Spreads with some resistance due to the glue's softness; some crumbling |
| Comparative 8 | Water PVP 90 P.G.[1] Glycerol Na Stearate Dowicil 150 | 60.10 25.70 03.50 03.50 07.00 00.20 100.00 | 22 g | Slightly soft | Creamy white | 25 sec | Easy | Easy | Spreads with some resistance due to the glue's softness: some crumbling |
| Comparative 9 | Water PVP 120 P.G. Glycerol Na Stearate Dowicil 150 | 73.62 12.00 03.60 03.60 07.00 00.18 100.00 | 22 g | Firm | White opaque | None after 10 min. | Easy | Easy | Very smooth spreading: however. appears that either glue is absorbed in the paper Or the amount of glue transferred is minimal. Very little if any dried glue residue is felt on the paper. No low M.W. adhesive. Even when water content approaches upper limit high M.W. adhesive does not spread. |
| Comparative 10 | Water PVP 120 P.G.[1] Glycerol Na Stearate Dowicil 150 | 81.29 12.00 01.63 01.63 03.25 00.02 100.00 | 22 g | Soft | White opaque | 4 min. | Easy | Easy | Spreads easily, doesn't crumble but loses its form and flattens when applied |

[1]Propylene glycol
[2]Wt. Avg. MW = 55,000
*Glue stick separated from the carry platform.

It can readily be seen that the compositions of matter of the present invention, in the form of glue sticks or crayons, provide a fast setting, non-toxic composition suitable for adhering porous substrates.

It is to be understood that, in the specification and accompanying claims, the formulations are considered to consist of components of two phases, e.g. liquids and solids. The liquid phase component is water or aqueous phase and all other components are considered solids, even though some components used in the invention may be thought of as liquids. The percentage of solids can thus be calculated by subtracting the percentage of liquid component from 100%. For example, if the liquid phase is 70% by weight, the solid phase is 30% by weight (100%−70%=30%). It thus can be appreciated that the formulations of the invention comprise a minor to equivalent percentage of solids to liquid, but yet are fast setting, strong bond forming adhesive compositions.

While the invention has been described in detail and with reference to specific embodiments thereof, it will be apparent to those skilled in the art that various changes and modifications can be made therein without departing from the spirit and scope thereof.

We claim:

1. A composition of matter comprising a mixture of the following components (A)–(D.):
   (A) about 45% to about 80% by weight water;
   (B) about 12 percent to about 26 percent by weight of at least one water soluble or water dispersible polypyrrolidone polymer exhibiting adhesive properties, said polymer having a molecular weight of less than about to 1,300,000;
   (C) a long-chain fatty acid , or a salt of a long-chain fatty acid, in an amount of from about 3% to about 10%;
   (D) a high molecular weight water-soluble or water dispersible polymer, said high molecular weight polymer having a molecular weight at least 1,300,000 and being present in an amount sufficient to impart fast film forming and strong final bond property to the composition, said composition being in a solid form.

2. The composition of claim 1 wherein component (B) comprises at least two polyvinylpyrrolidone polymers, the polymers having different molecular weights.

3. The composition of claim 2 wherein the weight ratio of the polyvinylpyrrolidone of lower molecular weight to the polyvinylpyrrolidone of greater molecular weight is not greater than about 1:1.

4. The composition of claim 1 wherein component (D) is present in an amount of from about 0.5 to about 4% by weight.

5. The composition of claim 1 wherein component (C) is sodium stearate.

6. The composition of claim 1 further comprising a component selected from the group consisting of glycerol, propylene glycol and mixtures thereof.

7. The composition of claim 1 further including a color indicator.

8. An adhesive crayon according to claim 1 wherein the water content is at least 50% by weight.

9. Porous substrates adhered by an adhesive formulation of claim 1.

10. The porous substrates of claim 9 wherein the porous substrate is selected from the group consisting of paper, wood, fabric and polystyrene foam.

11. A composition of matter in solid form at ambient conditions comprising:
    (A) from about 45% to about 80% by weight of water;
    (B) from about 12% to about 26% of at least one polyvinylpyrrolidone polymer of molecular weight less than about 1,300,000,
    (C) from about 3% to about 10% of a long chain fatty acid or salt thereof; and
    (D) from about 0.5% to about 4% of a polyvinylpyrrolidone polymer having a molecular weight in the range of from about 1,300,000 to about 2,800,000.

12. The composition of claim 11 wherein component (A) is present in an amount of at least 50% by weight.

13. The composition of claim 11 further comprising an effective amount of a mildecide.

14. The composition of claim 11 further comprising a color indicator in an amount of from about 0.01% to 0.5% by weight.

15. Porous substrates adhered by an adhesive formulation of claim 13.

16. The porous substrates of claim 14 wherein the porous substrate is selected from the group consisting of paper, wood, fabric and polystyrene foam.

17. The composition of claim 11 further comprising at least one component selected from the group consisting of solvents, plasticizers and mixtures thereof.

18. The composition of claim 11 wherein component (C) is sodium stearate.

19. The composition of claim 11 further comprising a color indicator selected from the group consisting of phenolphthalein and thymolphthalein.

20. An adhesive crayon comprising the composition according to claim 11 in solid form wherein the solid phase is from about 30% to about 50% by weight.

21. The composition of claim 1 further comprising at least one plasticizer.

* * * * *

UNITED STATES PATENT AND TRADEMARK OFFICE
CERTIFICATE OF CORRECTION

PATENT NO. : 6,066,689
DATED : May 23, 2000
INVENTOR(S) : Peter S. Columbus, John Anderson It is certified that error appears in the above-identified patent and that said Letters Patent is hereby corrected as shown below:

Column 2,
Line 56, please delete the word "polyvinylpyrollidone" and replace it with
-- polyvinylpyrrolidone --.

Column 3,
Line 16, after the word "crayon", please delete "." and replace it with -- , --.
Line 49, after the words "Chemicals Corporation", please delete "." and replace it with
-- , --.

Column 4,
Line 3, please delete the word "polyvinylpyrollidone" and replace it with
-- polyvinylpyrrolidone --.
Line 26, please delete "$C_{16}$" and replace it with -- $C_{26}$ --.

Column 6,
Line 8, please delete "isobenzofiuranone" and replace it with -- isobenzofuranone --.

Under columns 5 and 6,
In the table appearing in Example 1, under the Heading "Spreading Properties", please insert a -- . -- after the word "spreading" and delete the word "appiied" and replace it with -- applied --.
In the table appearing in Example 2, under the Heading "Spreading Properties", please insert a -- , -- after the word "spreading" and insert -- 1, -- after the word "Ex.".
In the table appearing in Examples 3, and 4 under the Heading "Chem.", please delete "P.G." and replace it with -- P.G.[1] --.

Under columns 7 and 8,
In the table appearing in Example 7, under the Heading "COLOR", please delete "Crearny" and replace it with -- Creamy -- and under the Heading "Spreading Properties", after the word "stick", please delete ":" and replace it with -- ; --.
In the table appearing in Example 8, under the Heading "Spreading Properties", please delete "crumbiing" and replace it with -- crumbling --.
In the table appearing in Example 9, under the Heading "Chem.", please delete the word "Thymoiphthalein" and replace it with -- Thymolphthalein -- and under the Heading "COLOR", after the word "applied", please delete "." and replace it with -- , --.
In the table appearing in Comparatives 1, 2, and 3, under the Heading "Spreading Properties", after the word "spreading", please delete "." and replace it with -- , --.
In the table appearing in Comparative 5, under the Heading "Setting Time", please delete "scc." and replace it with -- sec. --.

UNITED STATES PATENT AND TRADEMARK OFFICE
CERTIFICATE OF CORRECTION

PATENT NO. : 6,066,689
DATED : May 23, 2000
INVENTOR(S) : Peter S. Columbus, John Anderson It is certified that error appears in the above-identified patent and that said Letters Patent is hereby corrected as shown below:

Under columns 9 and 10,
In the table appearing in Comparative 6, under the Heading "Chem.", please delete "PVP $30^1$" and replace it with -- PVP $30^2$ -- and under the Heading "Spreading Properties", please delete the word "resistancc" and replace it with -- resistance --.
In the table appearing in Comparative 8, under the Heading "Spreading Properties", after the word "softness", please delete ":" and replace it with -- ; --.
In the table appearing in Comparative 9, under the Heading "Chem.", please delete the word "P.G." and replace it with -- P.G.1 -- and under the Heading "Spreading Properties", after the word "spreading", please delete ":" and replace it with -- ; -- and after the word "however", please delete "." and replace it with -- , -- and after the word "paper", please delete "0r" and replace it with -- or --.
In the table Comparative 10, under the Heading "GMS.", please delete "00.02" and replace it with -- 00.20 --.

Column 11,
Line 21, please delete "(D.)" and replace it with -- (D) --.

Column 12,
Line 17, after "1,300,000" please insert -- ; --.
Line 27, please delete "mildecide" and replace it with -- mildewcide --.

Signed and Sealed this

Eleventh Day of December, 2001

Attest:

NICHOLAS P. GODICI
Attesting Officer
Acting Director of the United States Patent and Trademark Office